Nov. 29, 1960  B. BLUMBERG  2,962,054
PLUMBING TEST APPARATUS
Filed Dec. 19, 1958
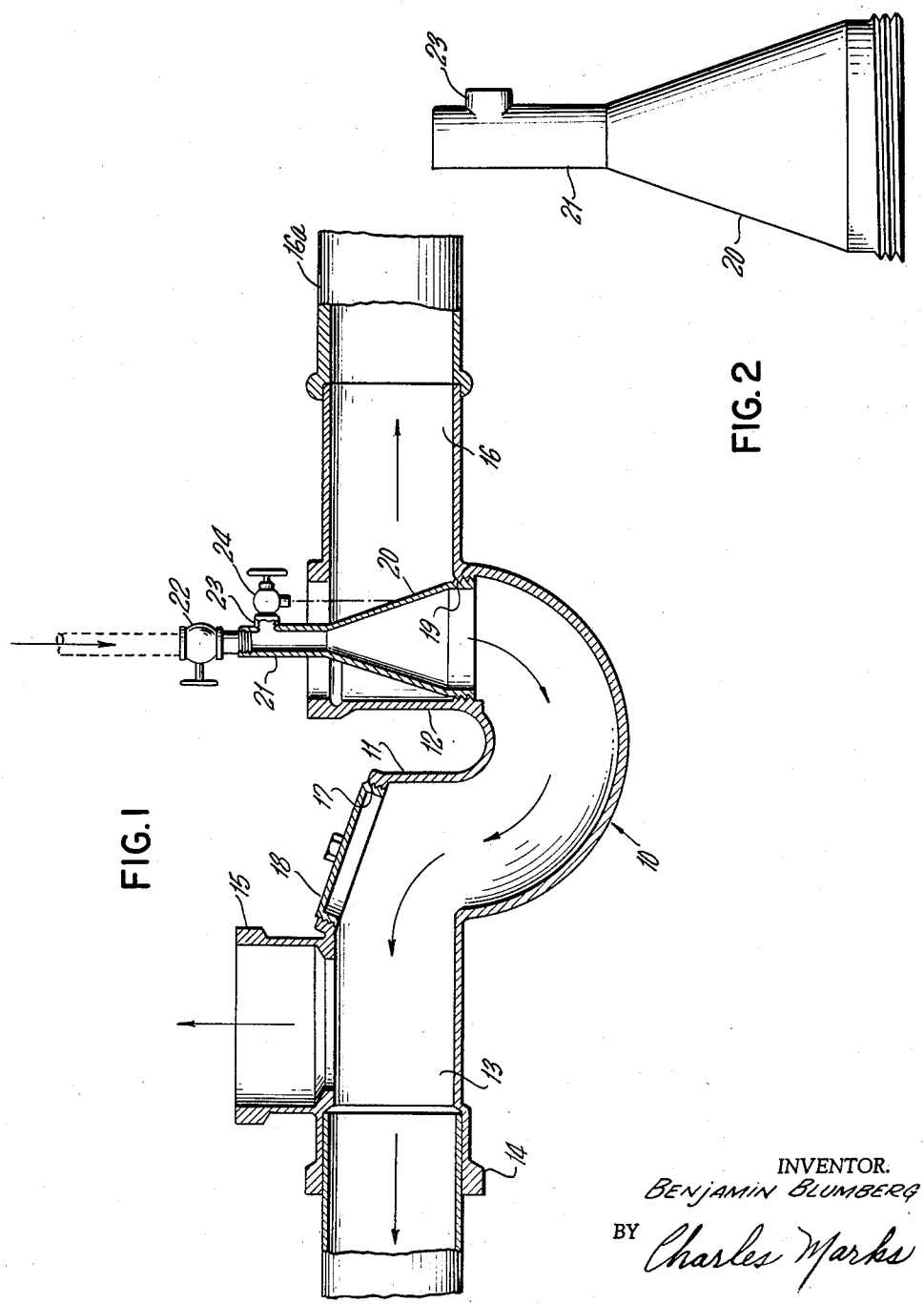
INVENTOR.
BENJAMIN BLUMBERG
BY Charles Marks
ATTORNEY

United States Patent Office 2,962,054
Patented Nov. 29, 1960

2,962,054

PLUMBING TEST APPARATUS

Benjamin Blumberg, 1851 E. 26th St., Brooklyn, N.Y.

Filed Dec. 19, 1958, Ser. No. 781,649

1 Claim. (Cl. 138—90)

This invention relates to an adjustable pipe fitting employed in the testing of plumbing systems.

Where water or sewage pipes are installed as part of the plumbing system of a public or private building, it is frequently necessary by reason of local ordinances to conduct pressure tests aimed at locating undesirable leakage from pipe joints in various parts of the system. In making such tests, it has been found convenient to plug one end of the system at a place where a conventional pipe trap is inserted in the line. Such plugs may be inserted in the trap so as to permit the introduction of water into that portion of the system to be tested, and, when the test is completed, the plugs may be either removed or adjusted so as to allow discharge of the test water through a suitable outlet.

However, conventional plugs are frequently expensive, complicated, difficult and time consuming in operation, and may accomplish undesirable diversions of water, as by splashing thereof in areas outside of the aforesaid outlet.

It is an object of the present invention to provide an adjustable test plug for use in performing a water test upon plumbing systems.

Another object of the invention is to provide a plug for this purpose which is adapted to become an integral part of the plumbing system after completion of the test.

A further object of the invention is to provide such a plug which will minimize undesirable splashing of water during the discharge thereof after it has been used for test purposes.

A still further object of the invention is to provide a test plug which is simple in design, economical to manufacture and easily installed and operated.

Other and further objects and advantages of the present invention will become apparent from the following description as read in connection with the accompanying drawing.

In the drawing:

Fig. 1 is a cross-sectional elevation showing a pipe trap wherein one form of the invention is depicted in operative position;

Fig. 2 is an elevational view of one member employed in the aforesaid form of the invention.

Similar reference numerals indicate corresponding parts in the said views.

As shown in Fig. 1 of the accompanying drawing, one embodiment of the invention comprises a U-shaped trap, generally designated by the numeral 10 and having two vertical legs 11, 12. On the left, a lateral inlet opening 13 communicates with one of said legs 11. This inlet opening may be connected, as by conventional bell and spigot joints 14, 15, to the plumbing system to be tested, commonly referred to as the "stack."

On the right, a lateral outlet opening 16 communicates with the remaining vertical leg 12. This outlet opening may also be connected to a suitable sewer pipe 16a for the purpose of discharging test water after completion of the test.

For cleaning purposes, an aperture 17 is provided on the upper side of the trap. Said aperture is internally threaded and normally is closed by an externally threaded cap 18.

Vertical leg 12 is internally threaded at 19, said threads commencing at the lowest portion of lateral outlet opening 16. A hollow frusto-conical member 20 is threadedly engaged with the aforesaid internal threads of vertical leg 12.

Said frusto-conical member 20 is also depicted in Fig. 2. As shown in this figure, frusto-conical member 20 is provided with a lower, externally threaded base portion. The upper portion of said frusto-conical member communicates with a cylindrical extension 21 which may be threadedly engaged with suitable means for introducing water into the cylindrical extension and thence to the interior of said frusto-conical member and the remainder of the system to be tested, said water following the path indicated by the arrows directed downwardly and to the left in Fig. 1. The water may be suitably regulated by inlet valve 22 and during testing said water may be allowed to accumulate above the level of the aforeseaid cylindrical extension 21.

The cylindrical extension is also provided with means for diverting such accumulated water, such as a side outlet 23 disposed radially of the axis of said cylindrical extension. Said side outlet may communicate from said cylindrical extension to a suitable angle valve 24 having a discharge opening disposed above the external surface of the frusto-conical member, as shown in Fig. 1, thereby permitting any water emptied through said discharge opening to impinge upon the said external surface of the frusto-conical member.

With this arrangement, it is noteworthy that any undesirable splashing of the water is minimized. To accomplish this, it is necessary that the radial distance from the axis of the cylindrical extension to and including the angle valve discharge opening be less than the radius of the base portion of the frusto-conical member.

During testing, inlet valve 22 may be opened to introduce water to the plumbing system, as desired, and angle valve 24 may be kept closed. When the test is completed, inlet valve 22 may be closed and angle valve 24 may be opened to permit discharge of water from the "stack" through the trap and cylindrical extension 21. After said water is discharged upon the surface of frusto-conical member 20, it passes through outlet opening 16 and thence to the sewer pipe connected thereto.

It is noteworthy that by reason of the position of the frusto-conical member, as depicted in Fig. 1, there is no undesirable accumulation of water in the outlet opening 16. Moreover, with the foregoing arrangement, it is entirely unnecessary to remove the frusto-conical member and its associated parts from the trap. It will also be seen that the valves employed therewith are easily accessible and that the entire unit may be quickly operated. In addition, the frusto-conical member may be easily and quickly installed and may also be economically manufactured by conventional methods.

Hence, it will be seen from the foregoing that the present invention provides an ingenious test trap arrangement which accomplishes the objects of the invention in a simple and efficient manner.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

A pipe testing device for use with a U-shaped trap having lateral inlet and outlet openings on its respective legs, the said lateral inlet opening being connectable to at least one pipe to be tested for its resistance to water leakage, said pipe testing device comprising a single rigid frusto-conical element having upper and lower cylindrical extensions, the upper extension having threads thereon for engagement with water inlet means, a radially disposed outlet extension on said upper cylindrical extension, the lower extension having threads thereon for engagement with the internal periphery of one of the legs of the trap, whereby the threaded engagement of the lower extension of the frusto-conical element with the internal periphery of one of the legs of the trap supports said frusto-conical element against axial displacement and aligns said water inlet means against lateral displacement, and a valve on the radial outlet means, whereby by controlling the inlet of water to the upper extension and the outlet of water from said radial extension the pressures on the pipe to be tested can be controlled.

References Cited in the file of this patent
UNITED STATES PATENTS

| | | |
|---|---|---|
| 610,452 | Loeble et al. | Sept. 6, 1898 |
| 1,155,821 | Kennedy | Oct. 5, 1915 |
| 1,326,626 | Wolfe | Dec. 30, 1919 |